(12) United States Patent
Snapp

(10) Patent No.: US 6,996,396 B1
(45) Date of Patent: Feb. 7, 2006

(54) METHOD OF AND APPARATUS FOR USE IN FORWARDING CALLS INTENDED FOR ROAMING SUBSCRIBER UNITS

(75) Inventor: John Lawrence Snapp, Bellevue, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 09/476,461

(22) Filed: Dec. 30, 1999

(51) Int. Cl.
*H04M 3/42* (2006.01)

(52) U.S. Cl. .................. 455/417; 455/432.1; 455/445

(58) Field of Classification Search ............. 455/422, 455/426, 412, 432, 433, 445, 461, 414, 417, 455/560, 422.1, 426.1, 412.1, 432.1, 414.1
See application file for complete search history.

(56) References Cited

U.S. PATENT DOCUMENTS

| | | | |
|---|---|---|---|
| 5,440,614 A * | 8/1995 | Sonberg et al. ............. 455/433 |
| 5,481,592 A * | 1/1996 | Azer ......................... 455/12.1 |
| 5,497,412 A * | 3/1996 | Lannen et al. ............. 455/432 |
| 5,526,400 A | 6/1996 | Nguyen |
| 5,579,375 A * | 11/1996 | Ginter ........................ 455/417 |
| 5,706,211 A | 1/1998 | Beletic et al. |
| 5,734,700 A * | 3/1998 | Hauser et al. ............. 455/426 |
| 5,815,810 A * | 9/1998 | Gallant et al. ............. 455/433 |
| 5,878,338 A * | 3/1999 | Alperovich et al. ........ 455/417 |
| 5,978,678 A * | 11/1999 | Houde et al. ............... 455/433 |
| 6,138,007 A * | 10/2000 | Bharatia .................. 455/414.1 |
| 6,157,831 A * | 12/2000 | Lamb ......................... 455/433 |
| 6,324,394 B1 * | 11/2001 | Vazvan ....................... 455/406 |
| 6,381,454 B1 * | 4/2002 | Tiedemann et al. ......... 455/419 |

FOREIGN PATENT DOCUMENTS

| WO | WO 98/05174 | 2/1998 |
|---|---|---|
| WO | WO 99/26434 | 5/1999 |

OTHER PUBLICATIONS

Bertrand, André, "Jambala Mobility Gateway—Convergence and Inter-System Roaming", Ericsson Review No. 02, 1999, http://www.ericsson.com/about/publications/review/1999_02/articles52.shtml, downloaded May 15, 2002, 1 pg.
Bertrand, André, "Jambala Mobility Gateway—Convergence and Inter-System Roaming", Ericsson Review No. 2, 1999, pp. 89-93, no month.

* cited by examiner

*Primary Examiner*—Charles N. Appiah
*Assistant Examiner*—Nghi H. Ly
(74) *Attorney, Agent, or Firm*—Paul E. Knowlton, Esq.; Cynthia R. Parks, Esq.; Parks Knowlton LLC

(57) ABSTRACT

A method for use in forwarding a call intended for a GSM-roaming subscriber unit (106) is performed by a mobility gateway (102) connected between an ANSI-41 network and a GSM network. The method includes associating the roaming subscriber unit (106) with one of a plurality of temporary transfer-to telephone numbers homed on a mobile switching center (118). The temporary transfer-to telephone number is used for an intermediate and temporary transfer of a call intended for the roaming subscriber unit (106) in response to some predetermined condition, such as a busy indication or expiration of time. This number is used to facilitate both the forwarding of the call to a voice mail system (116) and the tearing down of international long-distance connections.

17 Claims, 6 Drawing Sheets

| IN USE ? | TEMP. TRANSFER-TO TELEPHONE NUMBER | ASSOCIATED MSC |
|---|---|---|
| Y | 303 555 2222 | DENVER |
| N | 303 555 3333 | DENVER |
| N | 206 555 6666 | SEATTLE |
| N | 206 444 4444 | SEATTLE |
| N | 206 123 4567 | SEATTLE |

METHOD OF AND APPARATUS FOR USE IN FORWARDING CALLS INTENDED FOR ROAMING SUBSCRIBER UNITS

BACKGROUND OF THE INVENTION

1. Field of the Invention

The present invention relates generally to the field of wireless telephone networks, devices, and related services such as voice mail. More particularly, the invention relates to mobility gateways which facilitate communication for wireless subscriber units in different networks, such as ANSI-41 and GSM networks.

2. Description of the Related Art

Wireless services provided to customers in the United States are primarily based on a standard known as American National Standards Institute (ANSI) 41. Wireless services provided to customers in Europe and a few non-European countries are primarily based upon the Global System for Mobile (GSM) standard. The ANSI-41 and the GSM networks are currently connected through gateways. Networks implementing one of these two different standards generate call requests and other messages using different protocols. Among other functions, the connecting gateways translate call requests from the ANSI-41 protocol to the GSM protocol (and vice versa as appropriate) to facilitate the exchange of call requests between these two networks.

Unfortunately, current ANSI-41/GSM gateways are limited to functions such as translating and delivering call requests. In certain circumstances as described below, these gateways are unable to help implement cost effective methods for providing an ANSI-41 customer roaming within a GSM network with call forwarding and related telephone services available to the ANSI-41 customer while in the ANSI-41 network.

One example of call forwarding use which is frequently selected by ANSI-41 customers is voice mail. When an ANSI-41 customer with voice mail is within the ANSI-41 network and unavailable to answer an incoming telephone call (either because the ANSI-41 customer's wireless telephone is inactive, or because the ANSI-41 customer's line is busy or not answered), the incoming call request is redirected to a forwarding telephone number which accesses the ANSI-41 customer's voice mail system. The voice mail system enables the calling party to leave an audio message for the ANSI-41 customer. Thus, voice mail services provide the ANSI-41 customer with an opportunity to identify and contact previous callers.

Unfortunately, if the ANSI-41 customer with voice mail is roaming within a GSM network and is unavailable to answer an incoming call, the availability of the ANSI-41 customer's voice mail service depends upon the reason why the ANSI-41 customer is unavailable. For example, suppose an ANSI-41 customer takes their wireless telephone to Europe and a caller in the United States uses a telephone connected to the public switched telephone network (PSTN) to place a call to the ANSI-41 customer. Once the ANSI-41 network receives the call request from the PSTN and determines the intended ANSI-41 customer is located in Europe, the ANSI-41 network forwards the call request through an ANSI-41/GSM gateway to the ANSI-41 customer in Europe.

If the ANSI-41 customer's wireless telephone is inactive, current GSM networks are able to indicate the wireless telephone's inactive status to the ANSI-41 network via the ANSI-41/GSM gateway before the call itself is forwarded to the GSM network. In this case, there are known cost-effective methods for efficiently forwarding the incoming call to the ANSI-41 customer's voice mail system so that the calling party can leave a message. These known methods are cost effective because only local telephone calls and corresponding local telephone charges are involved for the calling party.

If the ANSI-41 customer's wireless telephone is active and the customer is available to answer the telephone, the call is completed in accordance with the call request and call forwarding type services are not implemented. However, if the ANSI-41 customer's wireless telephone is active and the telephone is either busy or not answered, current GSM networks are unable to indicate this wireless telephone status information to the ANSI-41 network. If current GSM networks were able to indicate this wireless telephone status information to the ANSI-41 network, then this situation could be handled in a manner similar to the known methods for handling the situation described above.

However, because current GSM networks are not designed to include the ability to indicate to the ANSI-41 network when a call to a wireless telephone goes unanswered or when the wireless telephone is busy, one of two different scenarios are likely to occur: (1) the calling party receives a message indicating the ANSI-41 customer is "out of network," the ANSI-41 customer receives a message indicating a call was missed, and no mechanism is provided which allows the calling party to access the ANSI-41 customer's voice mail service; or (2) the GSM network, having received the call, forwards the call from the GSM network to the ANSI-41 customer's voice mail service via the ANSI-41 network without indicating status information to the ANSI-41 network.

Unfortunately, both of the above two scenarios have drawbacks. With the first scenario, the message received by the ANSI-41 customer does not enable the ANSI-41 customer to identify the calling party. With the second scenario, the calling party is able to identify him/her self to the ANSI-41 customer, but this method is not cost effective because the calling party is charged for two long distance international calls. The first international call charge results from the original call path from the ANSI-41 network to the GSM network in Europe, and the second international call charge results when the GSM network forwards the first call path back to the ANSI-41 network to establish a connection to the ANSI-41 customer's voice mail service.

SUMMARY OF THE INVENTION

Apparatus and methods for use in forwarding a call intended for a roaming subscriber unit are described herein. In one inventive aspect, the method includes storing, at a mobility gateway, a plurality of temporary transfer-to telephone numbers homed on a mobile switching center; and associating the roaming subscriber unit with one of the temporary transfer-to telephone numbers. The temporary transfer-to telephone number is used for an intermediate and temporary transfer of a call intended for the roaming subscriber unit in response to a predetermined condition, such as a busy indication or expiration of time. This number is used to facilitate both the forwarding of the call to a call forwarding number and the tearing down of international long-distance connections.

DETAILED DESCRIPTION OF THE PREFERRED EMBODIMENTS

Figure 1:
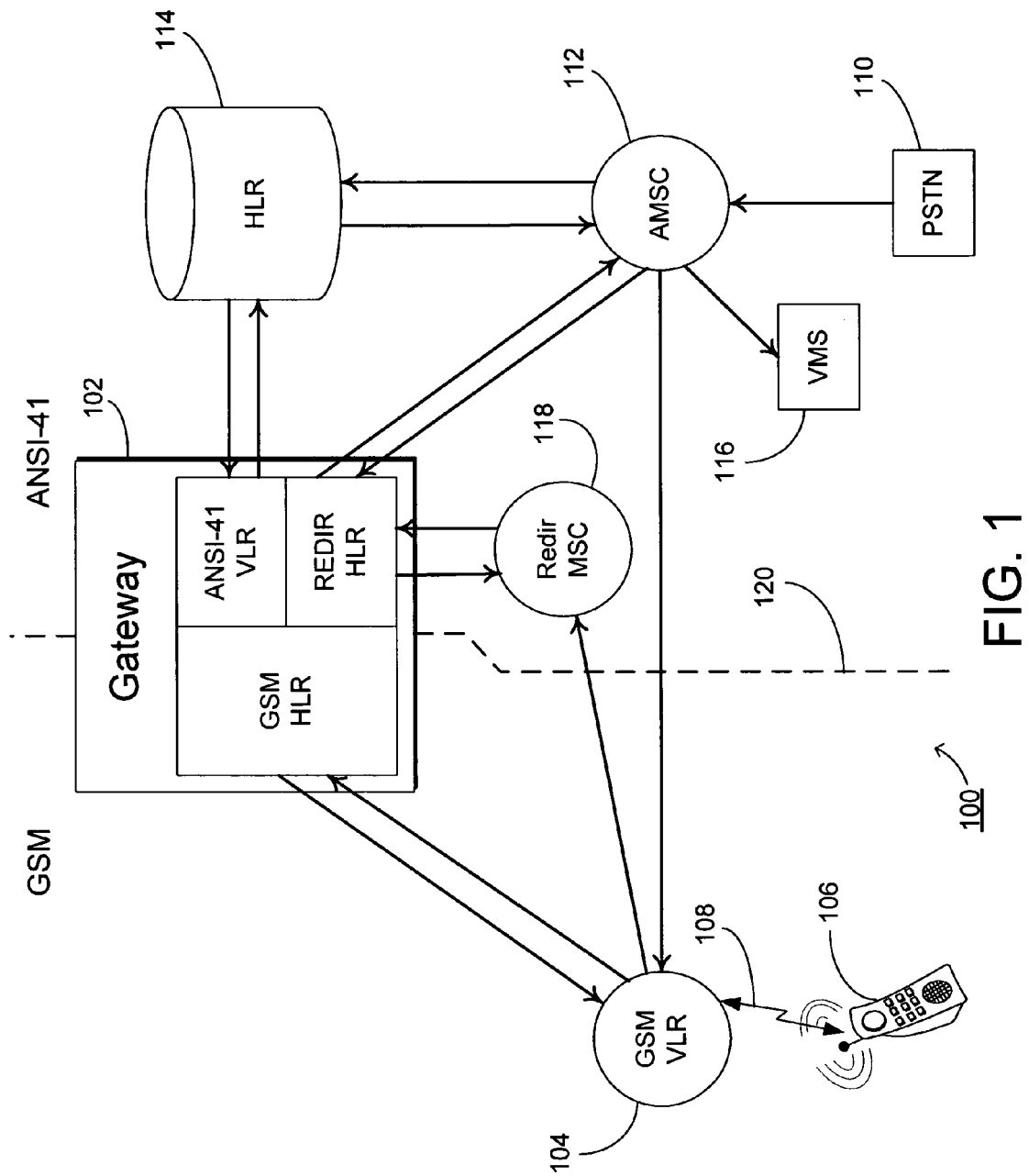
FIG. 1 is a diagram showing a wireless communication network, including a mobility gateway (MGW) connected between a GSM network and a ANSI-41 network, and a roaming subscriber unit in the GSM network.

The present invention provides a technique for more efficiently redirecting a call request to a predetermined forwarding telephone number (such as a voice mail system access telephone number). The invention may be advantageously applied where (1) a call request arrives at the ANSI-41 network; (2) the call request is intended for an ANSI-41 network customer who is currently roaming within a GSM network; (3) the ANSI-41 network customer's wireless telephone is currently active; and (4) the ANSI-41 network customer's wireless telephone either is not answered or is busy. The present invention is based on enhancing the functionality of current ANSI-41/GSM gateways.

Upon activation, a ANSI-41 wireless telephone registers on a GSM network and roams within a geographic area served thereby. Upon this registration, a temporary transfer-to telephone number is assigned to the ANSI-41 customer's wireless telephone. More specifically, a GSM mobile switching center (MSC) nearest the wireless telephone (hereinafter "GSM serving MSC") requests a temporary transfer-to telephone number from an ANSI-41/GSM gateway connected between the ANSI-41 network and the GSM network. The gateway informs an ANSI-41 network home location register (HLR) that the ANSI-41 customer is currently roaming in the GSM network, queries the HLR to confirm the ANSI-41 customer's account is in good standing, obtains the temporary transfer-to telephone number homed on a "redirection" MSC, and sends this temporary transfer-to telephone number to the GSM serving MSC.

Thereafter, when a call request intended for the ANSI-41 customer is received by the ANSI-41 MSC to which the ANSI-41 customer is assigned (hereinafter "anchor MSC"), the anchor MSC utilizes the HLR and the gateway to obtain from the GSM serving MSC a current roaming telephone number assigned to the ANSI-41 customer by the GSM network. The anchor MSC uses this obtained roaming telephone number to establish a call to the ANSI-41 customer's wireless telephone via the GSM MSC.

If the wireless telephone does not answer the call or is busy, the GSM serving MSC uses the temporary transfer-to telephone number to forward the call to the redirection MSC. The redirection MSC then coordinates with the gateway, which sends a redirection request message to the anchor MSC. Upon receiving the redirection request message from the gateway, the anchor MSC tears down the call established to the GSM serving MSC by the anchor MSC, which also results in tearing down the portion of the established call which was forwarded to the redirection MSC by the GSM serving MSC. The anchor MSC redirects the received call request to a forwarding telephone number previously provided by the ANSI-41 customer. This forwarding telephone number may be the telephone number used to access a voice mail system for the ANSI-41 customer. The anchor MSC may obtain this forwarding telephone number, for example, from the HLR. Once the call request is forwarded to the ANSI-41 customer's voice mail system, the calling party may leave an audible message for the ANSI-41 customer.

A "temporary transfer-to telephone number" is defined herein as follows. For one, a temporary transfer-to telephone number is one that is homed on some MSC. A temporary transfer-to telephone number is different from the subscriber telephone number and the call forwarding number associated with the subscriber unit. It is a call forwarding number that is used in an intermediate and temporary fashion between the subscriber telephone number and the call forwarding number associated with the subscriber unit. Thus, the temporary transfer-to telephone number may be referred to as an intermediate transfer-to telephone number or as a temporary and intermediate transfer-to telephone number. Prior to activation and registration, a roaming subscriber unit need not be uniquely identified or associated with a temporary transfer-to telephone number. Put another way, temporary transfer-to telephone numbers may be dynamically assigned to roaming subscriber units. Although the MSC that homes the temporary transfer-to telephone number could be a GSM MSC, it is preferably an AT&T ANSI-41 MSC.

The present invention solves the drawbacks described above with reference to the scenario described in (1) above by providing a method for redirecting a call request intended for an ANSI-41 customer under circumstances where redirection services are currently unavailable. The present invention also solves the cost efficiency drawback of the scenario described in (2) above by eliminating the use of international long distance telephone calls to forward a call request to an ANSI-41 customer's voice mail system.

The implementation will now be described in detail in connection with FIG. 1 which shows a diagram of a wireless communication network 100. Wireless communication network 100 includes components such as a mobility gateway (MGW) 102 communicatively coupled between a GSM network and an ANSI-41 network (divided generally by a line 120), a subscriber unit 106 roaming in the GSM network, a GSM mobile switching center (MSC) 104 shown to be serving the roaming subscriber unit 106, an ANSI-41 gateway mobile switching center (MSC) 112 (or "anchor MSC") communicatively coupled to a public switched telephone network (PSTN) 110, an ANSI-41 home location register (HLR) 114 communicatively coupled to ANSI-41 gateway MSC 112 and MGW 102, a redirection MSC 118 communicatively coupled to MGW 102 and GSM serving MSC 104, and a voice mail system (VMS) 116 communicatively coupled to ANSI-41 MSC 112. Subscriber unit 106 is indeed a wireless portable telephone device which communicates using radio frequency (RF) signals 108. Where indicated in FIG. 1, "VLR" is known as a visitor location register. An MSC may be referred to as a "mobile telephone switching office" (MTSO). For clarity and brevity in the remaining description, "ANSI-41" may be referred to as "ANSI".

Many of the components of wireless communication network 100 are conventional and use conventional technologies and methods where otherwise unspecified. However, MGW 102 has components which are modified to embody inventive aspects described herein. Preferably, MGW 102 is modified to accommodate the present invention in a manner described such that no other components in wireless communication network 100 need modification.

Figure 2:
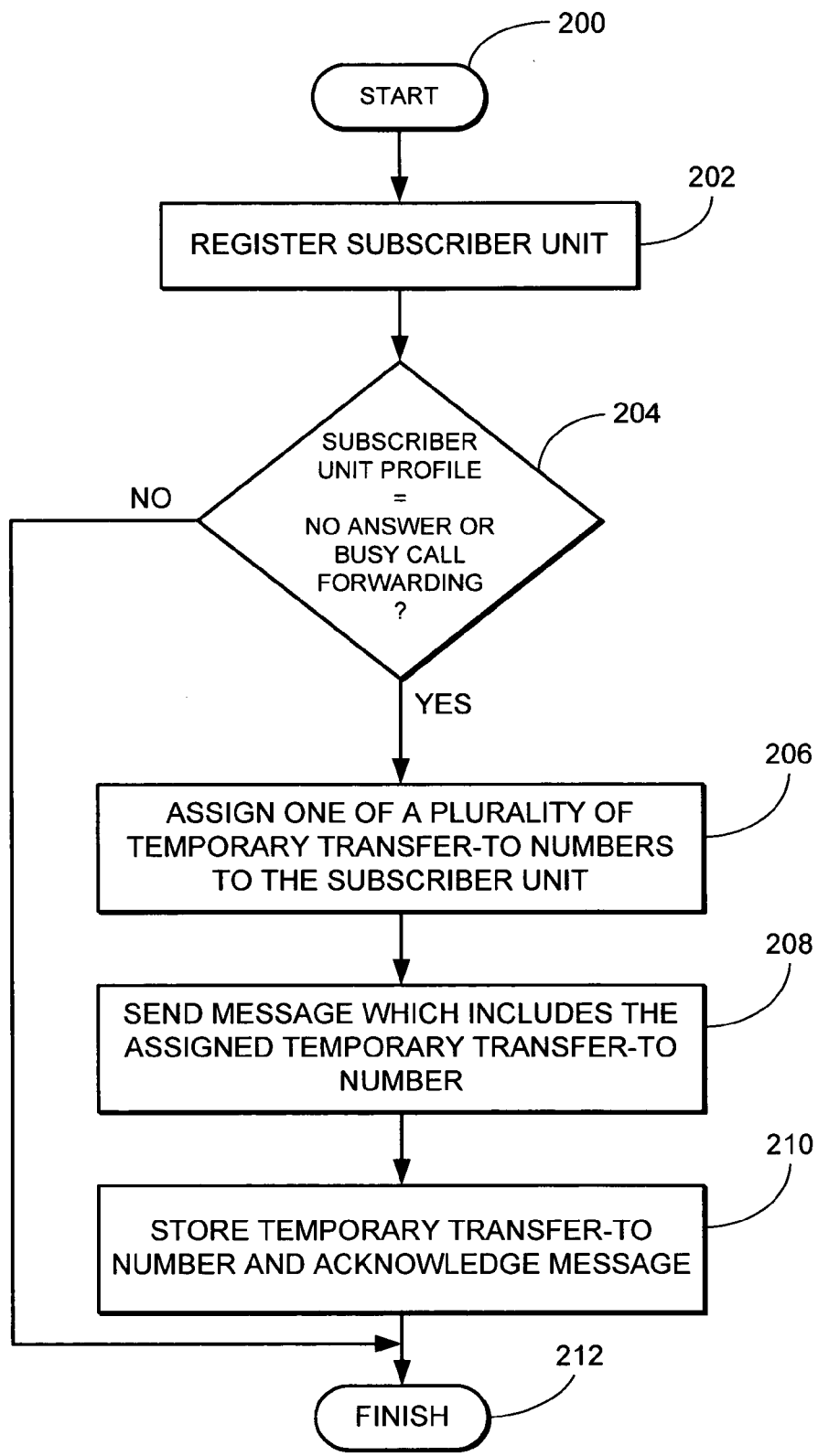
FIG. 2 is a flowchart describing a method for use in forwarding a call intended for the roaming subscriber unit of FIG. 1.
Figure 3A:
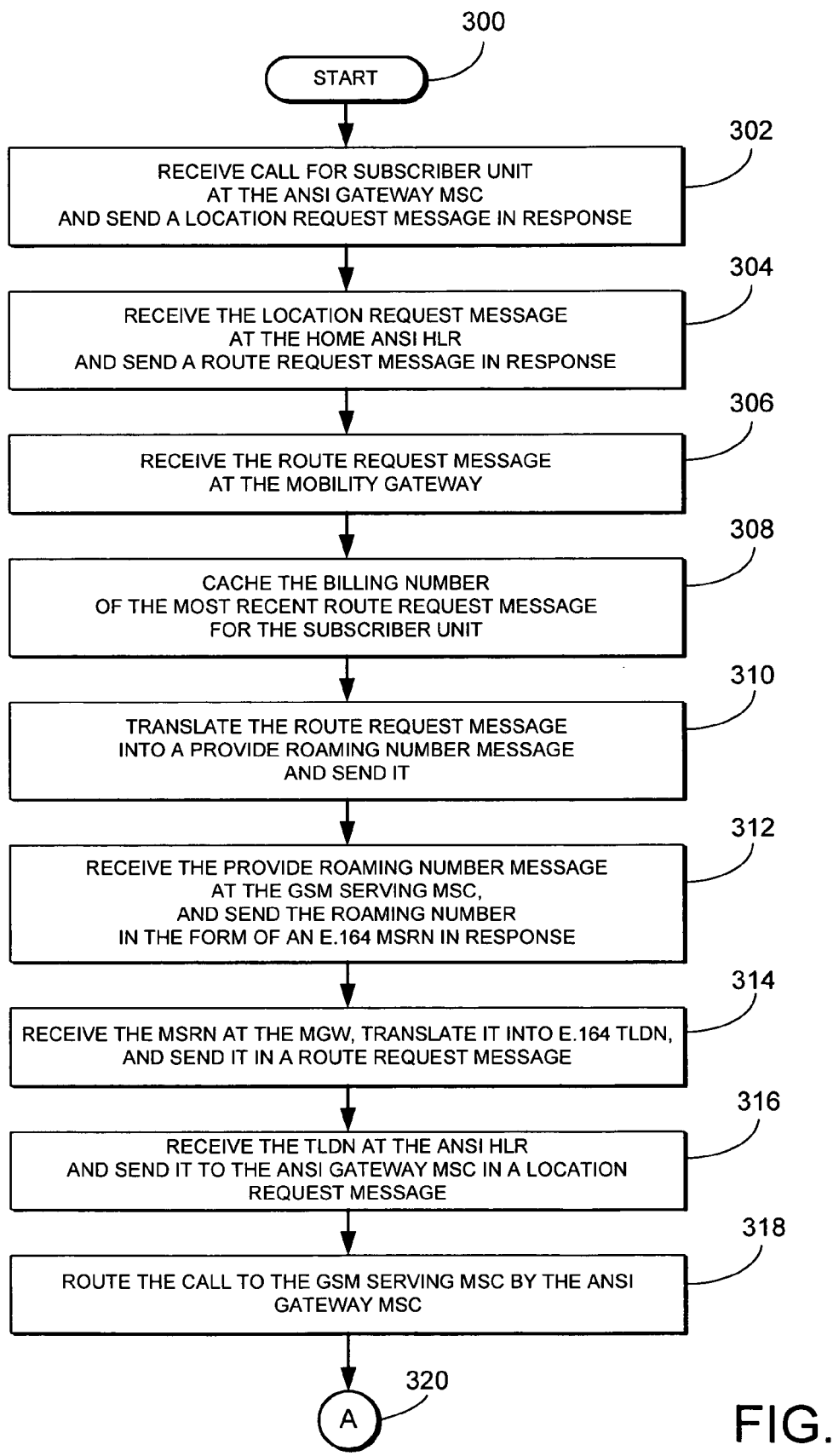
FIGS. 3A–3B form a flowchart of a method for use in forwarding a call intended for the roaming subscriber unit, which is used in connection with the method described in relation to FIG. 2.
Figure 3B:
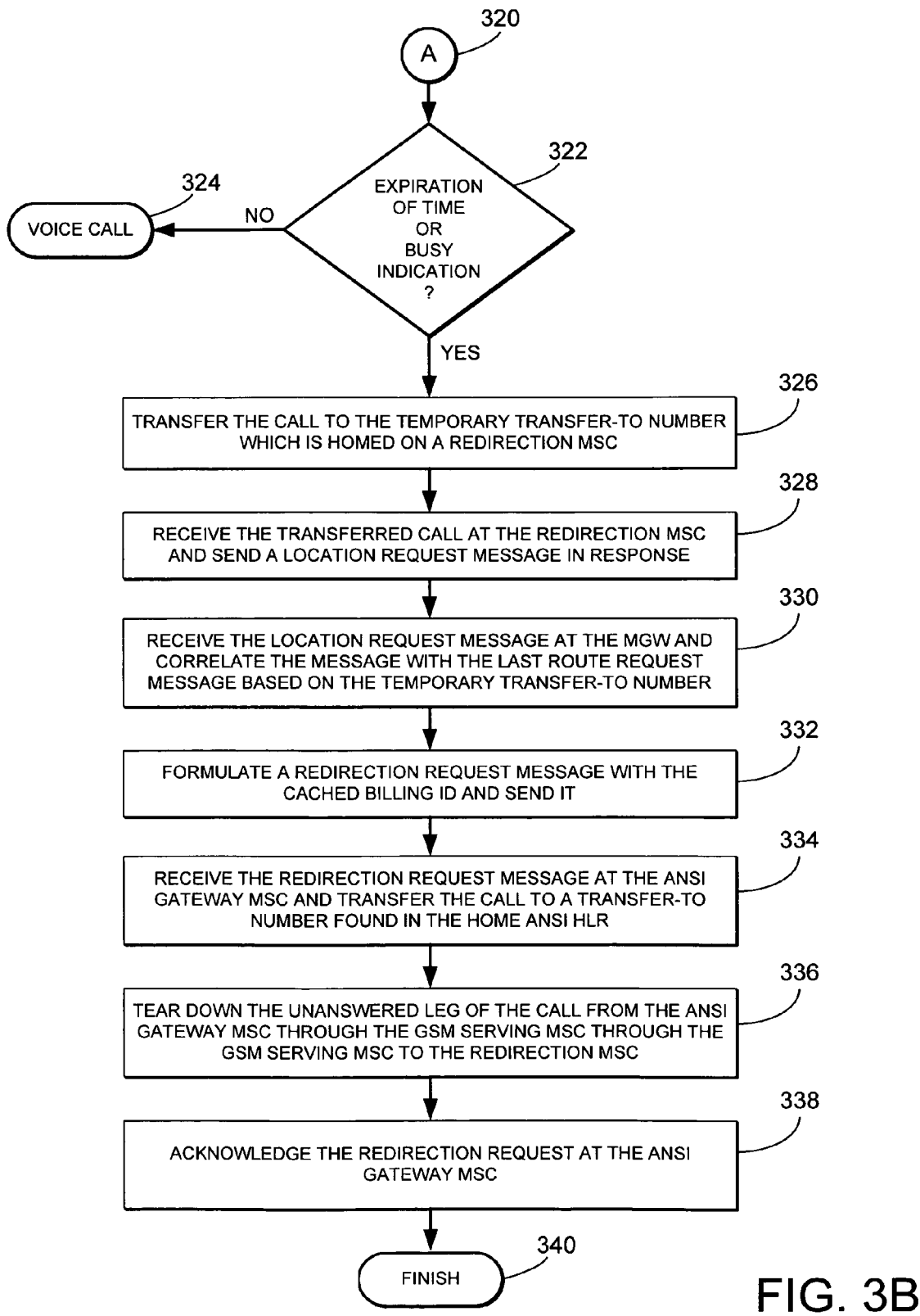
Figure 4:
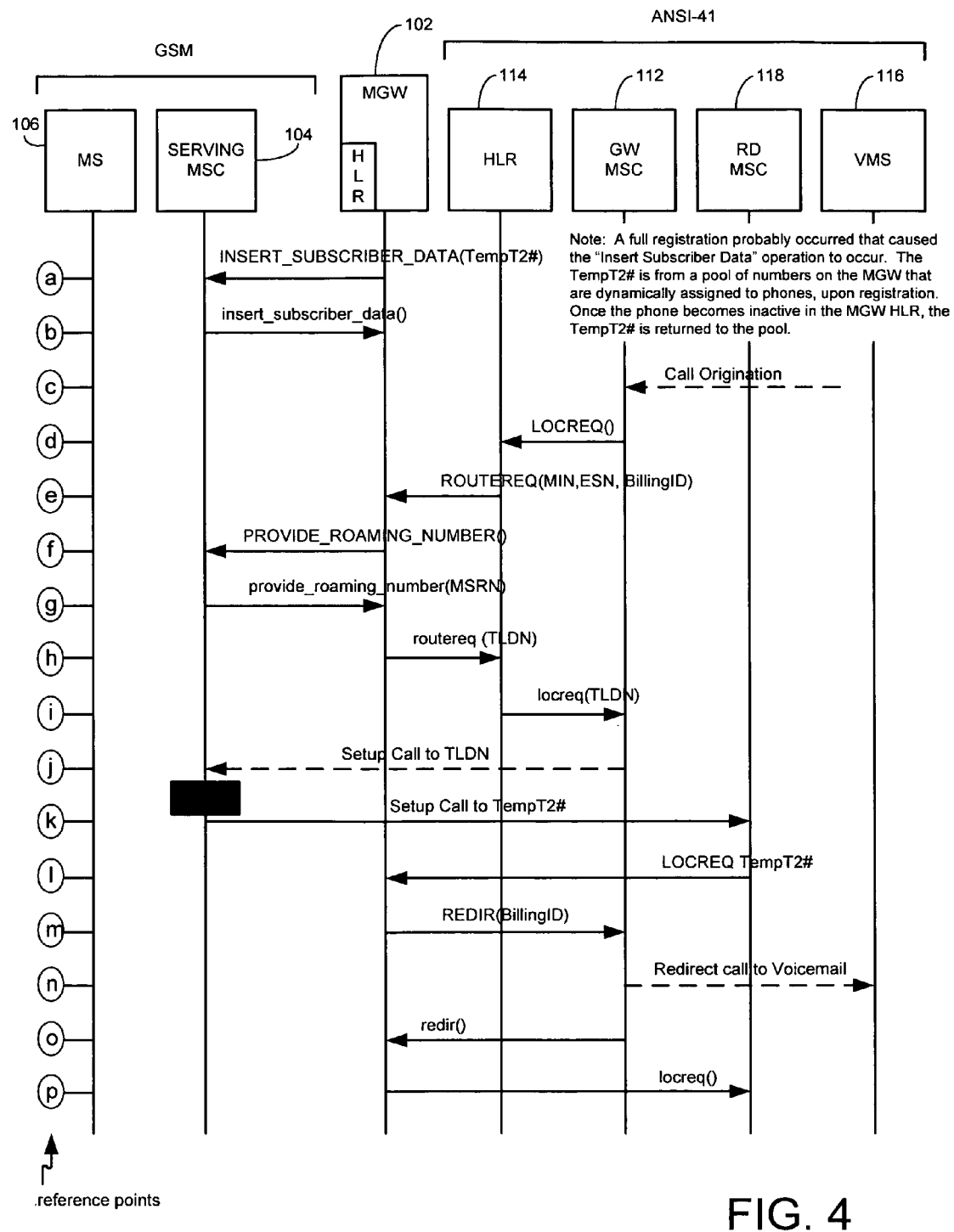
FIG. 4 is a call flow diagram of the methods described in relation to FIGS. 2–3.

The entire system method is described in relation to all of the flowcharts of FIGS. 2, 3A, and 3B, as well as a call flow diagram shown in FIG. 4. The methods described herein may be embodied and implemented in connection with software, such as with software components 600 indicated in FIG. 6. Such software may be embedded in or stored on a disk 602 or memory 604, and executable on a computer 606 or a processor 608.

Figures 5, 6:
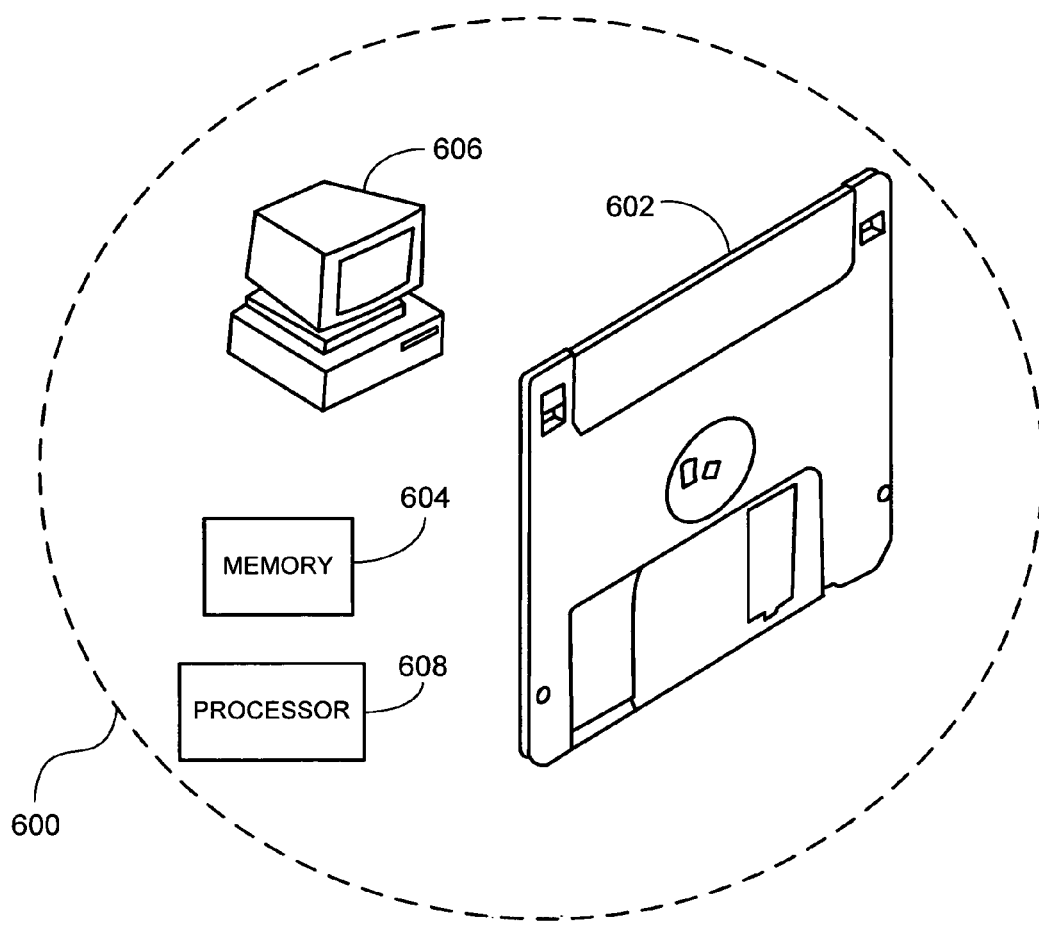
FIG. 5 is an exemplary illustrative table showing a pool of temporary transfer-to telephone numbers.
FIG. 6 is an illustration of various components used to implement the inventive aspects described herein.

Referring now to FIG. 2, a flowchart describing a method for use in forwarding a call intended for roaming subscriber unit 106 is shown. FIGS. 1, 2, and 5 will be referred to in combination while stepping through the flowchart of FIG. 2. Beginning at a start block 200, subscriber unit 106 is activated in the GSM system and registration occurs (step 202). Here, a profile uniquely associated with subscriber unit 106 is returned from ANSI HLR 114. If the profile indicates that a forwarding feature is enabled for subscriber unit 106 (step 204), then the flowchart continues at step 206, but otherwise ends at a finish block 212. The forwarding feature may be or include a "No Answer Forwarding" or a "Busy Call Forwarding" feature. Such features may provide for forwarding to a transfer-to number at a voice mail answering service of VMS 116.

If the forwarding feature is enabled at step 204, MGW 102 assigns one of a plurality of temporary transfer-to telephone numbers to subscriber unit 106 (step 206). Each one of the temporary transfer-to telephone numbers is homed on some "redirection" MSC. There may be one or more redirection MSCs defined for the method, and each redirection MSC may have several temporary transfer-to telephone numbers for use by the method. In this example, the temporary transfer-to telephone number assigned to subscriber unit 106 is homed on redirection MSC 118. Since MGW 102 has its own pool of temporary transfer-to telephone numbers, the number is then "marked" as being in use. Referring briefly to FIG. 5, an exemplary illustrative table 500 having a plurality of temporary transfer-to telephone numbers is shown. The temporary transfer-to telephone numbers are listed in a column 502; their associated MSCs are listed in a column 504 and associated use markings are listed in a column 506. Table 500 may also associate each marked temporary transfer-to telephone number with an identification of its corresponding roaming subscriber unit.

Next, MGW 102 constructs and sends a message which includes the temporary transfer-to telephone number to GSM serving MSC 104 (step 208). More particularly, the temporary transfer-to telephone number is populated into both the busy field ("CFB" field) and the no answer field ("CFNA" field) of an INSERT_SUBSCRIBER_DATA message. This message is received at GSM serving MSC 104, which stores the temporary transfer-to telephone number and acknowledges the message (step 210). These steps are indicated at points A and B in FIG. 4. The flowchart ends at the finish block 212. Subscriber unit 106 is now registered and operates in "standby mode".

FIGS. 3A and 3B show a flowchart describing further steps of the method. The steps in the flowchart of FIG. 3A are used to locate and page a subscriber unit that is roaming in a GSM system, and are mostly conventional. While stepping through the flowchart of FIG. 3A, FIGS. 1, 3A, and 5 will be referred to in combination.

Beginning at a start block 300 of FIG. 3A, ANSI gateway MSC 112 receives a call request for subscriber unit 106 through PSTN 110 and sends a location request message ("LOCREQ" message) in response (step 302). This is indicated at points C and D in FIG. 4. ANSI HLR 114 receives the location request message and sends a route request message ("ROUTEREQ" message) in response to MGW 102 (step 304). This step is indicated at point E in FIG. 4. The route request message includes the billing identification (ID), as well as a mobile identification number (MIN) and an electronic serial number (ESN).

Next, MGW 102 receives the route request message (step 306), caches the billing identification (ID) of the most recent route request message for subscriber unit 106 (step 308), translates the route request message into a provide roaming number message "PROVIDE_ROAMING_NUMBER" message) and sends it to GSM serving MSC 104 (step 310). These steps are indicated at point F in FIG. 4. GSM serving MSC 104 receives the provide roaming number message, and replies with the roaming number in the form of an E.164 Mobile Station Roaming Number (MSRN) (step 312). This is indicated at point G in FIG. 4. MGW 102 receives the MSRN, translates it into a national or E.164 temporary local directory number (TLDN), and sends it to the ANSI HLR 114 in a route request message ("ROUTEREQ" message) (step 314). This step is indicated at point H of FIG. 4. ANSI HLR 114 receives the TLDN and sends it to ANSI gateway MSC 112 in a location request message ("LOCREQ" message) (step 316). This step is indicated in point I of FIG. 4. Finally, the call is routed by ANSI gateway MSC 112 to GSM serving MSC 104 (step 318). This step is indicated at point J in FIG. 4. As indicated by a connector 320 or "A", the flowchart continues in FIG. 3B.

Referring now to FIG. 3B, subscriber unit 106 is paged in response to the call indication. Subscriber unit 106 may or may not answer the page or call, or may be "busy". If subscriber unit 106 answers the call, where no expiration of time or busy indication occurs (step 322), a voice call proceeds (step 324). If an expiration of time or a busy indication exists at step 322, GSM serving MSC 104 transfers the call to the temporary transfer-to telephone number homed on the redirection MSC 118 (step 326). This is indicated at point K in FIG. 4.

Redirection MSC 118 receives the transferred call, and sends a location request message ("LOCREQ" message) to MGW 102 in response (step 328). The location request message includes the temporary transfer-to number. Step 328 is indicated at point L in FIG. 4. MGW 102 receives the location request message and, based on the temporary transfer-to telephone number, correlates the message with the last route request message it received for subscriber unit 106 (step 330). After this correlation, MGW 102 formulates a redirection request message ("REDIRECTIONREQUEST" message) with the cached billing ID and sends it to ANSI gateway MSC 112 (step 332). This step is indicated at point M in FIG. 4. As apparent, the method steps are configured so that the temporary transferred call is not "answered" in a conventional manner.

ANSI gateway MSC 112 receives this message and transfers the call to a transfer-to number found in ANSI HLR 114 (step 334). This transfer-to number may route the call to VMS 116 for voice mail service associated with subscriber unit 106. This step is indicated at point N in FIG. 4. Per the standard, this causes a tearing down of the international long-distance call, for example, the unanswered leg of the call from ANSI gateway MSC 112 through GSM serving MSC 104 to redirection MSC 118 (step 336). That is, what is torn down are the connections indicated at points J and K of FIG. 4.

In response, ANSI gateway MSC 112 acknowledges the redirection request (step 338). This is indicated at point O of FIG. 4. The flowchart ends at a finish block 340. As an option, MGW 102 responds to the location request message with a number that sends the call to an announcement. The announcement only plays if the redirection request has the wrong billing ID because of multiple simultaneous calls to the same subscriber unit.

Steps 326 through steps 338 occur relatively quickly in wireless communication network 100, for example, on the order of about one second. Once subscriber unit 106 becomes inactive in the GSM network (e.g., powers off), the temporary transfer-to number associated therewith is then "unmarked" and is available for similar use by the same or another subscriber unit. Preferably, the methods described in relation to FIGS. 2, 3A, and 3B repeat for continuous operation in the system.

Thus, a method for use in connection with a mobility gateway for forwarding a call directed to a roaming subscriber unit has been described. In one important inventive aspect, the method includes storing at the mobility gateway a plurality of transfer-to telephone numbers; and selecting one of the temporary transfer-to telephone numbers for association with the roaming subscriber unit. The inventive method may further include sending a message having the temporary transfer-to telephone number to a mobile switching center serving the roaming subscriber unit.

This method may also include receiving and storing information related to a call request for the roaming subscriber unit, and subsequently receiving a location request message from a mobile switching center which homes the temporary transfer-to telephone number. In addition, the inventive method may include associating the location request message with the call request for the roaming subscriber unit. The association may be done based at least in part on the temporary transfer-to telephone number. Finally, the method may include sending a redirection request message to a gateway mobile switching center which received the call request.

In another important inventive aspect, a method includes all of the steps of receiving and storing information related to a call request for a roaming subscriber unit; after receiving and storing, receiving a location request message from a mobile switching center which homes a temporary transfer-to telephone number associated with the roaming subscriber unit; associating the location request message with the call request for the roaming subscriber unit; and after associating, sending a redirection request message to a gateway mobile switching center which received the call request for the roaming subscriber unit.

In yet other aspects, a mobility gateway for use in connection between an ANSI-41-based network and a GSM-based network includes a processor which is operative to perform steps of the methods described. A inventive computer program product includes software which is executable to perform steps of the methods described.

In conclusion, the methods and apparatus described herein are advantageous for providing features, such as call forwarding and voice mail, for subscriber units of a first network to roam in a second network. What is used is a temporary and intermediate transfer-to telephone number. As described, international long-distance portions of the call may be torn down to advantageously reduce the cost of the call.

What is claimed is:

1. A method for use in a mobility gateway for forwarding a call directed to a roaming subscriber unit, the method comprising:
    storing in memory, at the mobility gateway coupled between a GSM network and an ANSI-41 based network, a plurality of temporary transfer-to telephone numbers;
    selecting, for association with the roaming subscriber unit, one of the temporary transfer-to telephone numbers;
    sending a message having the temporary transfer-to telephone number to a mobile switching center serving the roaming subscriber unit;
    after selecting and sending, receiving, and storing information related to a call request for the roaming subscriber unit: and
    after receiving and storing, receiving a location request message from a mobile switching center which homes the temporary transfer-to telephone number.

2. The method according to claim 1, wherein the temporary
    transfer-to telephone number is homed on a mobile switching center that is different from a mobile switching center serving the roaming subscriber unit.

3. The method according to claim 1, further comprising:
    associating the location request message with the call request for the roaming subscriber unit.

4. The method according to claim 3, further comprising:
    after associating, sending a redirection request message to a gateway mobile switching center which received the call request.

5. The method according to claim 1, further comprising:
    associating the location request message with the call request for the roaming subscriber unit based at least in part on the temporary transfer-to telephone number.

6. A mobility gateway for use in connection between an ANSI-41-based network and a GSM-based network, the mobility gateway comprising:
    a processor;
    memory for storing a plurality of temporary transfer-to telephone numbers homed on one or more mobile switching centers (MSCs) that is different from a mobile switching center serving a roaming subscriber unit:
    said processor being operative for:
        selecting one of the plurality of temporary transfer-to telephone numbers for association with the roaming subscriber unit;
        sending a message having the temporary transfer-to telephone number to a GSM MSC serving the roaming subscriber unit;
        after selecting and sending, receiving and storing information related to a call request for the roaming subscriber unit; and
        after receiving and storing, receiving a location request message from an MSC which homes the temporary transfer-to telephone number.

7. The mobility gateway according to claim 6, wherein the selected temporary transfer-to telephone number associated with the roaming subscriber unit is homed on an ANSI-41 MSC different from a GSM MSC serving the roaming subscriber unit.

8. The mobility gateway according to claim 6, wherein said processor is further operative for:
    associating the location request message with the call request for the roaming subscriber unit.

9. The mobility gateway according to claim 8, wherein said processor is further operative for:
   after associating, sending a redirection request message to an ANSI gateway MSC Which received the call request.

10. The mobility gateway according to claim 6, wherein said processor is further operative for:
    associating the location request message with the call request for the roaming subscriber unit based at least in part on the temporary tansfer-to telephone number.

11. A method for use in forwarding a call between an ANSI-41 based network and a GSM-based network intended for a subscriber unit, comprising:
    receiving and storing information related to a call request for a roaming subscriber unit;
    after receiving and storing, receiving a location request message from a mobile switching center which homes a temporary transfer-to telephone number associated with the roaming subscriber unit;
    after receiving a location request message from a mobile switching center, correlating the message with a previous request message received by a mobility gateway;
    associating the location request message with the call request for the roaming subscriber unit; and
    after associating, sending a redirection request message to a gateway mobile switching center which received the call request for the roaming subscriber unit.

12. The method according to claim 11, further comprising, prior to receiving and storing the information related to the call request:
    selecting the temporary transfer-to telephone number for association with a roaming subscriber unit; and
    sending a message having the temporary transfer-to telephone number to a mobile switching center serving the roaming subscriber unit.

13. The method according to claim 11, further comprising:
    wherein the receiving and storing of information related to the call request includes receiving and storing information comprising subscriber identification information and call identification information; and
    wherein sending the redirection request message includes sending the call identification information.

14. The method according to claim 11, further comprising:
    wherein receiving the location request message comprises receiving the temporary transfer-to telephone number; and
    wherein associating the location request message with the call request comprises associating based on the temporary transfer-to telephone number.

15. A method for use in a mobility gateway coupled between an ANSI-41 based network and a GSM-based network, comprising:
    selecting a temporary transfer-to telephone number for association with a roaming subscriber unit;
    sending a message having the temporary transfer-to telephone number to a mobile switching center serving the roaming subscriber unit;
    after selecting and sending, receiving and storing information related to a call request for the roaming subscriber unit;
    after receiving and storing, receiving a location request message from a mobile switching center which homes the temporary transfer-to telephone number;
    after receiving a location request message from a mobile switching center, correlating the message with a previous request message received by a mobility gateway;
    associating the location request message with the call request for the roaming subscriber unit; and
    after associating, sending a redirection request message to a gateway mobile switching center which received the call request for the roaming subscriber unit.

16. The method according to claim 15, further comprising:
    wherein the receiving and storing of information related to the call request includes receiving and storing information comprising subscriber identification information and call identification information; and
    wherein sending the redirection request message includes sending the call identification information.

17. The method according to claim 15, wherein the mobile switching center serving the roaming subscriber unit comprises a GSM mobile switching center and the gateway mobile switching center comprises an ANSI gateway mobile switching center.

* * * * *